(12) United States Patent
Mar

(10) Patent No.: US 6,785,378 B2
(45) Date of Patent: Aug. 31, 2004

(54) GLOBAL TITLE TRANSLATION WITH LOAD SHARING

(75) Inventor: Ituriel Mar, Saltillo (MX)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 596 days.

(21) Appl. No.: 09/930,992

(22) Filed: Aug. 17, 2001

(65) Prior Publication Data

US 2002/0052203 A1 May 2, 2002

Related U.S. Application Data

(63) Continuation of application No. PCT/EP00/00570, filed on Jan. 26, 2000.

(51) Int. Cl.[7] .............................................. H04M 7/00
(52) U.S. Cl. ..................... 379/229; 379/221.1; 379/230
(58) Field of Search ............................. 379/221.1, 230, 379/229

(56) References Cited

U.S. PATENT DOCUMENTS 5,583,976 A 12/1996 Bullard, Jr.
5,708,702 A 1/1998 De Paul et al.
6,383,755 B1 * 5/2002 Davis et al. ................... 435/6

FOREIGN PATENT DOCUMENTS

WO    WO98/51096    11/1998

* cited by examiner

*Primary Examiner*—Ahmad F. Matar
*Assistant Examiner*—Rasha S AL-Aubaidi

(57) ABSTRACT

A method of routing signalling information at a signalling transfer point of a telecommunication network. A Global Title Routing Case (GTRC) table is provided for mapping Global Titles to GTRCs, where each GTRC is allocated a primary and secondary destination signalling point. At least one peak time period is predefined, and said primary and secondary destination signalling points are swapped for a fraction of said GTRCs during said peak period to allow for load sharing during this period. For a signalling transfer request received at the signalling transfer point, the Global Title associated with the request is mapped to a GTRC using the GTRC table, and the destination signalling point is determined in dependence upon the primary and secondary destination signalling points allocated to the mapped GTRC and signalling point availability, and, in the case of said fraction of GTRCs, the time at which the request is received.

12 Claims, 2 Drawing Sheets

GLOBAL TITLE TRANSLATION WITH LOAD SHARING

This application is a continuation of International Application No. PCT/EP00/00570 filed on Jan. 26. 2000, which International Application was not published by the International Bureau in English on Aug. 24. 2000.

FIELD OF THE INVENTION

The present invention relates to routing in a telecommunications network and more particularly to the routing of signalling information between signalling transfer points of a telecommunications network.

BACKGROUND TO THE INVENTION

In a modern telecommunications network, a considerable amount of signalling information is continually being exchanged between signalling transfer points of the network. Examples of signalling transfer points are network switches, databases, etc. The actual signalling information being exchanged may be associated with a specific telephone call, e.g. relating to call set-up or termination, or may relate to network management functions. Complex protocols have been created to deal with the exchange of signalling information. In particular, Signalling System no. 7 (SS7) defines (subject to certain national/regional variations) a suite of protocol parts (or levels) capable of dealing with modern network signalling demands.

FIG. 1 illustrates schematically the "structure" of SS7 (it will be appreciated that the SS7 parts are generally implemented by means of software running on computer processors). On top of the SS7 stack sit the user and application parts which are the entities which make use of and provide signalling information. For example, an ISDN User Part (ISUP) controls the setting up and control of inter-exchange connections for subscriber calls whilst a Mobile Application Part (MAP) handles database queries in a mobile network (e.g. to determine the current location of a mobile subscriber).

At the bottom of the SS7 is the Message Transfer Part (MTP) which in fact comprises three distinct levels. Level 1 defines the physical, electrical, and functional characteristics of a digital signalling link. MTP level 1 has a number of different possible forms including the European standard E.1 (2048 kb/s and 3264 kb/s channels). MTP level 2 takes care of the accurate end-to-end transmission of messages across a chosen signalling link, whilst MTP level 3 handles the routing of signalling messages between neighbouring signalling links based upon information received from higher SS7 levels concerning the final destination of a signalling message. MTP level 3 handles inter alia re-routing of messages away from failed or congested signalling links.

Routing by MTP level 3 is carried out based on a destination signalling point and subsystem number (SSN), provided to the MTP by a higher SS7 layer. In particular, for the Transaction Capabilities Application Part TCAP (which handles database queries for the MAP, INAP etc) a Signalling Connection and Control Part (SCCP) generates the destination signalling point and subsystem number using a process termed "Global Title translation". The SCCP typically carries out a Global Title translation on a Global Title (GT), which may be a dialled Intelligent Network (IN) service number, e.g. an 800 number, a subscriber identification number or the like, using a Global Title Routing Case (GTRC) table. This table contains a mapping between GT series and GTRCs (a GTRC typically being one of an ordered series of numbers). A further GTRC translation is then performed to map the determined GTRC to an associated primary destination signalling point (and subsystem number). The destination signalling point is in some cases referred to as a "Destination Point Code" (DPC).

A Global Title routing case defines, by way of the destination signalling point, the route via which signalling information is transmitted. Especially during peak calling times, certain routes may become congested with large volumes of signalling traffic. Indeed, it is often the case that when a call is initiated, the primary destination signalling point generated by the GT and GTRC translations associated with the call, is unavailable. In such a situation (and following the broadcast of a congestion message from a given signalling point to neighbouring signalling points), a secondary destination signalling point, defined as a back-up for the primary destination signalling point, is used to route the signalling information. This procedure is described in ITU-T Recommendation Q.714 (Chapter 5).

It will be appreciated that the secondary destination signalling point handles overflow signalling information which the primary destination signalling point is unable to handle. It will also be appreciated that when overflow occurs, the processor(s) at the primary destination signalling point will be working at maximum capacity whilst those at the secondary destination signalling point may be working well below that maximum capacity. It may also happen that the secondary destination signalling point subsequently becomes congested, requiring the transfer of signalling information back to the primary destination signalling point (if the primary signalling point remains congested, a further switch back to the secondary point may occur, and so on). This switching back and forward between the primary and secondary destination signalling points may result in the loss of signalling information.

SUMMARY OF THE PRESENT INVENTION

It is an object of the present invention to overcome or at least mitigate the disadvantages outlined in the preceding paragraph. In particular, it is an object of the present invention to avoid or mitigate congestion associated with signalling traffic routed by the Signalling Connection and Control Part.

These and other objects are achieved by defining peak periods during which heavy signalling traffic is expected. During these peak periods, a proportion of the Global Titles normally allocated to a given destination signalling point are automatically reallocated to an alternative destination signalling point.

According to a first aspect of the present invention there is provided a method of routing signalling information at a signalling transfer point of a telecommunications network, the method comprising:

providing a Global Title Routing Case (GTRC) table mapping Global Titles to GTRCs;

allocating to each GTRC a primary and a secondary destination signalling point;

predefining at least one first time period and at least one second time period;

swapping said primary and secondary destination signalling points for a fraction of said GTRCs for the duration of said second period;

for a signalling transfer request at the signalling transfer point, mapping the Global Title associated with the request to a GTRC using the GTRC table; and determining the destination signalling point to be used for the request in dependence upon the primary and secondary destination signalling points allocated to the mapped GTRC and signalling point availability.

By carefully selecting said second time period(s) to correspond to known peak signalling traffic periods, embodiments of the present invention automatically divert traffic away from the primary destination signalling point without having to wait until congestion of the primary destination signalling point actually occurs. The resulting load sharing reduces the risk of congestion at the primary and secondary destination signalling points. This results in a more optimal use of processor power at the destination signalling points and also reduces the need to transfer signalling traffic from a congested route to a back-up route. Furthermore, as the maximum volume of signalling traffic through a given signalling point is likely to be reduced, the maximum processing power specified for the point (i.e. its "dimensioning") can be reduced, resulting in a considerable cost saving.

It will be understood that the term "Global Titles" encompasses, but is not limited to, calling and called party telephone numbers, subscriber identity number, mobile identification number, and the like. The GTRC table may map Global Titles to GTRCs using Global Title series, i.e. where Global Titles are grouped into series and each series is mapped to a corresponding GTRC.

Preferably, said destination signalling points are Destination Point Codes (DPC) or the like, which DPCs identify signalling transfer points designated to receive the signalling information.

Preferably, at least one first time period and at least one second time period are defined for every 24 hours period of operation. More preferably, said first and second periods correspond to relatively low usage periods and relatively high usage periods respectively.

Preferably, the method comprises defining said first and second periods based upon previous experience of signalling traffic through the signalling transfer point. More preferably, said periods are adapted automatically to reflect changes in traffic levels with time.

Preferably, the method of the present invention is employed in a Signalling Connection and Control Part (SCCP) of a Signalling System no. 7 (SS7) network.

According to a second aspect of the present invention there is provided apparatus for routing signalling information at a signalling transfer point of a telecommunications network, the apparatus comprising:

first memory means for storing a Global Title Routing Case (GTRC) table mapping Global Titles to GTRCs;

second memory means for storing for each GTRC allocated primary and secondary destination signalling points;

first signal processing means for swapping said primary and secondary destination signalling points for the duration of a predefined time period; and second signal processor means arranged to receive signalling transfer requests and to determine the destination signalling point to be used for the request in dependence upon the primary and secondary destination signalling points allocated to the mapped GTRC and signalling point availability.

Preferably, the apparatus comprises intelligent processing means arranged to respond to changing signalling traffic levels over time, by adapting the duration and position of said time period.

According to a third aspect of the present invention there is provided a Signalling Connection and Control Part (SCCP) for use in a Signalling System no. 7 signalling network, the SCCP comprising:

a Global Title Routing Case (GTRC) table mapping Global Titles to GTRCs;

a primary and a secondary destination signalling point allocated to each GTRC;

a definition of at least one first time period and one second time period;

means arranged to swap said primary and secondary destination signalling points for a fraction of said GTRCs for the duration of said second period;

means for mapping a Global Title, associated with a signalling transfer request received at the signalling transfer point, to a GTRC using the GTRC table; and means for determining the destination signalling point to be used for the request in dependence upon the primary and secondary destination signalling points allocated to the mapped GTRC and signalling point availability.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

A conventional Signalling System no. 7 (SS7) protocol stack has been described above with reference to FIG. 1. In particular, the Signalling Connection and Control Part (SCCP) has been described including its role in transforming Global Titles (GTs) into Destination Point Codes (DPCs) via Global Title Routing Cases (GTRCs).

Figure 2:
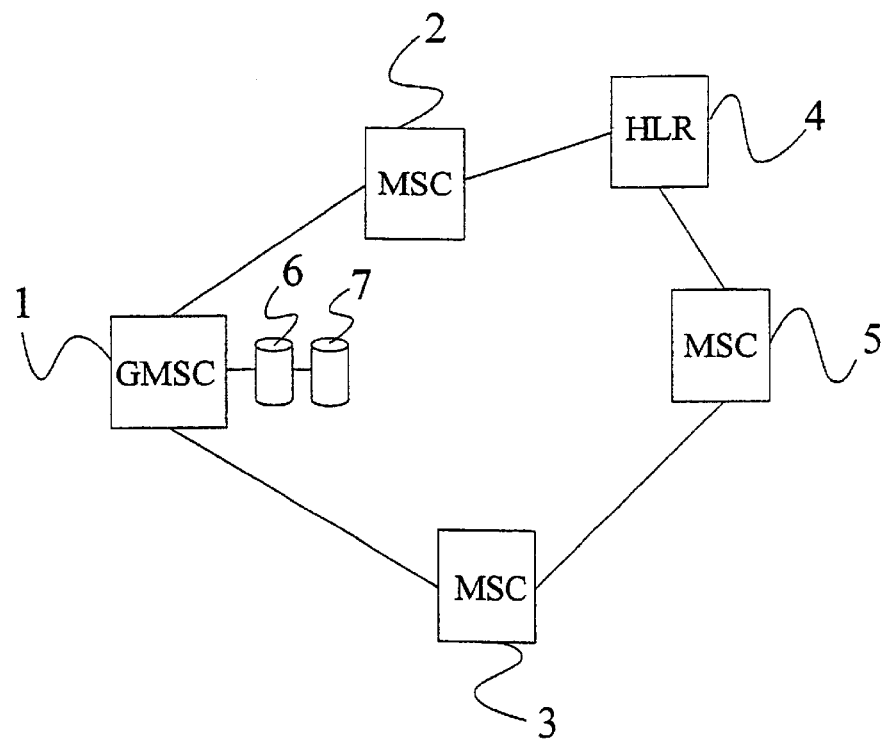
FIG. 2 illustrates schematically a mobile telecommunications network comprising a number of signalling transfer points.

FIG. 2 illustrates a mobile telecommunications network comprising a Gateway Mobile Switching Centre (GMSC) 1 which provides a gateway into and out of the mobile network for "foreign" networks. The GMSC 1 is connected directly to a pair of Mobile Switching Centres (MSCs) 2,3. One of these MSCs 2 is connected directly to a Home Location Register (HLR) 4, whilst the other of the MSCs 3 is connected indirectly to the HLR 4 via a third MSC 5. Each of the MSCs, GMSC, and HLR can be considered a Signalling Transfer Point (STP) for signalling traffic being transmitted over the network between peer application or user parts (e.g. ISUPs, TCAPs etc).

Figure 1:
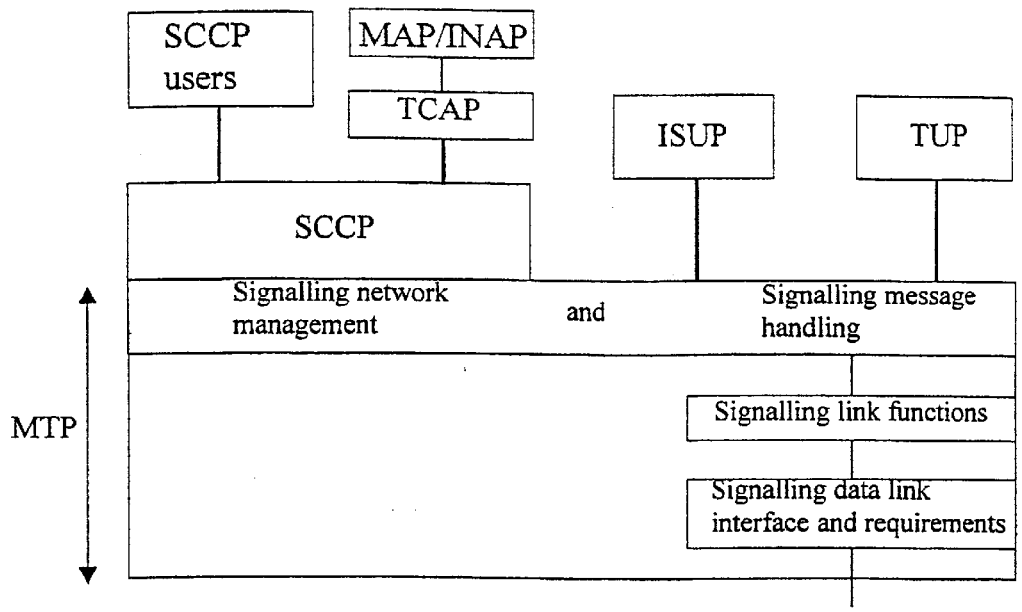
FIG. 1 shows schematically the protocol levels of a Signalling System no. 7 signalling network.

Each of the STPs of the network of FIG. 2 comprises a computer/processor programmed to implement the SS7 protocol of FIG. 1. In particular, the SCCP is implemented at each STP for the purpose of routing TCAP messages over the signalling network. As already described above, on the basis of a GT associated with a TCAP message, the SCCP determines the Destination Point Code (DPC) associated with the destination SPC (or a next "hop" SPC in the case where the signalling information is sent to the destination SPC via one or more intermediate STPs).

Considering the case where the GMSC 1 wishes to request information about the status (current location, etc) of a mobile subscriber, a database request must be sent from the GMSC 1 to the HLR 4. From FIG. 2, it will be appreciated that the most direct (and therefore primary) route for the associated signalling information is via the MSC 2, whilst a secondary route is via the MSCs 3 and 5.

A first database 6 (a "GT translation database") associated with the GMSC 1 contains a table mapping GT series to respective GTRCs. Thus, for example, all called party numbers commencing with the digits 123 or 124 are mapped to GTRC 1, all called party numbers commencing with the digits 125 are mapped to GTRC 2, and all called party numbers commencing with the digits 126 are mapped to GTRC 3. A second database 7 (a "GTRC translation" database) maps GTRCs to respective primary and secondary DPCs, e.g. GTRC 1 and 2 are mapped to DPC 1-2-3 (using the network-cluster-member notation) as primary DPC and DPC 1-2-4 as secondary DPC, whilst GTRC 3 is mapped to DPC 1-1-1 as primary DPC and DPC 2-2-2 as secondary DPC. The GT translation GTRC translation databases are illustrated respectively in Tables 1 and 2 below.

On the basis of its experience of expected network signalling traffic, the operator of the mobile network defines one or more peak use periods (for a given day) during which signalling traffic is expected to be high. For example, the operator may define the periods 9 am to 10 am and 1 pm to 2 pm as peak traffic periods. Outside of these periods, the computer running the SCCP maintains the GTRC translation database 6 in a given state, with each GTRC being mapped to the usual primary and secondary DPCs. When the signalling traffic is low, it is to be expected that the primary DPC can handle the traffic without becoming congested. However, if congestion does occur, then the secondary DPC may be used to handle any signalling traffic overflow.

When the peak user periods are entered, the computer performs an automatic reconfiguration of the GTRC translation database, such that for certain GTRCs, the primary and secondary DPCs are swapped. For example, and with reference to Table 1 below, the primary and secondary DPCs allocated to GTRC 1 and 3 may remain unchanged during the peak period, whilst for GTRC 2 the normal primary and secondary DPCs are swapped, such that the primary DPC becomes DPC 1-2-4 and the secondary DPC becomes 1-2-3.

Figure 3:
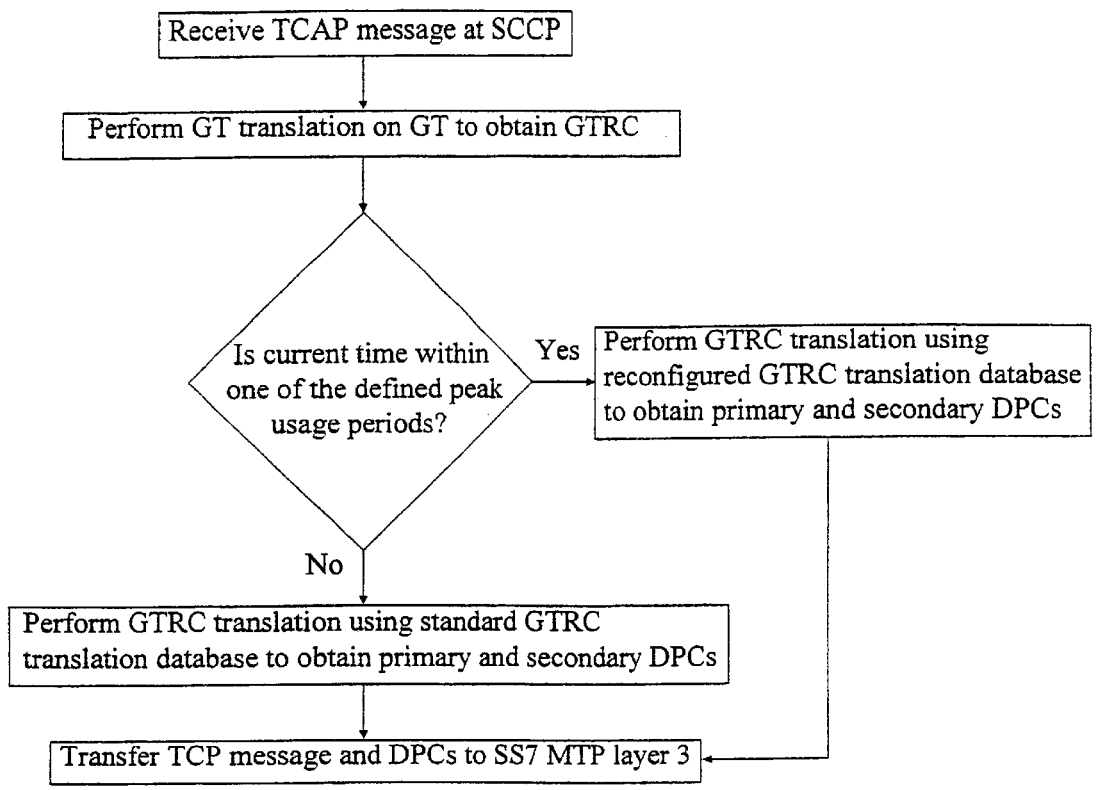
FIG. 3 is a flow diagram illustrating the routing of signalling information in the network of FIG. 2.

Considering the example of FIG. 2, outside of the peak periods, TCAP messages having GTs falling into either one of the 123xxx, 124xxx, or 125xxx series will preferably be routed via the primary route, i.e. via the MSC 2. However, during the peak periods, TCAP messages having GTs falling within the 125xxx series will preferably be transferred via the old secondary route, i.e. via MSCs 3 and 5, whilst TCAP messages having GTs falling within the 123xxx or 124xxx series will continue to be transferred via the primary route. FIG. 3 illustrates this route allocation process by way of a flow diagram.

The route allocation process described above will generally result in a more even distribution or sharing of signalling traffic between signalling routes, as it avoids the need to occupy a given route to its capacity before a reallocation takes place.

Signalling traffic levels are generally not predictable over long periods of time. For this reason, it may be appropriate to record a signalling level history and to adapt the definitions of low and peak usage periods accordingly. For example, if it is recognised that a certain route is becoming congested during a time period not currently falling within a "peak" period, a new peak period may be defined during which the GTRC translation database is reconfigured. One possible mechanism for achieving this is as follows. When a node becomes congested, the node sends to other nodes in the network an SCCP/Subsystem Congested message (SSC) including a congestion level. Receiving nodes save such messages in a history file, together with an identification of the originating node (i.e. its DPC) and the time of receipt/transmission. The history file is used to determine future peak periods and DPC swaps. Alternatively, or in addition, the history file may comprise information derived using answer echo/reply messages (referred to as Test, SST, and Subsystem Status Allowed (SSA)), where the delay in receiving a reply is a measure of the congestion in the remote node and the congestion in the network.

It will be appreciated by the skilled person that various modifications may be made to the above described embodiment without departing from the scope of the present invention. For example, the invention is not limited to STPs of mobile networks but may be applied to any signalling network employing the SCCP. It will also be appreciated that, where the volume of signalling traffic merits it, a GTRC may be mapped to a primary DPC and a plurality of secondary DPCs, i.e. two or more.

Alternatively, or in addition, several GTRCs having the same primary DPC, may have different secondary DPCs such that during peak periods signalling traffic can be diverted from the primary DPC to two or more secondary DPCs.

TABLE 1

| Global Title series | GTRC |
|---|---|
| 123xxx | 1 |
| 124xxx | 1 |
| 125xxx | 2 |
| 126xxx | 3 |
| ... | ... |

TABLE 2

| GTRC | Primary DPC | Secondary DPC | Peak period reconfiguration |
|---|---|---|---|
| 1 | 1-2-3 | 1-2-4 | NO |
| 2 | 1-2-3 | 1-2-4 | YES |
| 3 | 1-1-1 | 2-2-2 | NO |
| ... | ... | ... | ... |

What is claimed is:

1. A method of routing signalling information at a signalling transfer point of a telecommunications network, the method comprising:

provinding a Global Title Routing Case (GTRC) table mapping Global Titles to GTRCs;

allocating to each GTRC a primary and a secondary destination signalling point;

predefining at least one first time period and at least one second time period, wherein the second time period defines at least one peak period during which heavy signalling traffic is expected;

swapping said primary and secondary destination signalling points for a fraction of said GTRCs for the duration of said second period;

for a signalling transfer request at the signalling transfer point, mapping the Global Title associated with the request to a GTRC using the GTRC table;

determining the destination signalling point to be used for the request in dependence upon the primary and secondary destination signalling points allocated to the mapped GTRC and signalling point availability; and in case the primary destination signalling point is unable to handle signalling information, the secondary destination signalling point is used to handle the signalling information.

2. A method according to claim 1, wherein the Global Titles are calling party telephone numbers, called party telephone numbers, subscriber identity numbers, or mobile identification numbers.

3. A method according to claim 1, wherein the GTRC table maps Global Titles to GTRCs using Global Title series.

4. A method according to claim 1, wherein said destination signalling points are Destination Point Codes (DPC), which DPC identifies a signalling transfer point designated to receive the signalling information.

5. A method according to claim 1, further comprising defining at least one first time period and at least one second time period for every 24 hour period of operation.

6. A method according to claim 1, wherein said first and second periods correspond to relatively low usage periods and relatively high usage periods respectively.

7. A method according to claim 6, comprising defining said first and second periods based upon previous experience of signalling traffic through the signalling transfer point.

8. A method according to claim 7, wherein said periods are adapted automatically to reflect changes in traffic levels over time.

9. A method according to claim 1, wherein the method is employed in a Signalling Connection and Control Part (SCCP) of a Signalling System no. 7 (SS7) network.

10. Apparatus for routing signalling information at a signalling transfer point of a telecommunications network, the apparatus comprising:

a first memory for storing a Global Title Routing Case (GTRC) table mapping Global Titles to GTRCs;

a second memory for storing for each GTRC allocated primary and secondary destination signalling points;

a first signal processor for swapping said primary and secondary destination signalling points for the duration of a predefined time period;

a second signal processor arranged to receive signalling transfer requests and to determine the destination signalling point to be used for the request in dependence upon the primary and secondary destination signalling points allocated to the mapped GTRC and signalling point availability; and in case the primary destination signalling point is unable to handle signalling information, the secondary destination signalling point is used to handle the signalling information.

11. Apparatus according to claim 10, comprising an adaptive processor arranged to respond to changing signalling traffic levels over time, by adapting the predefined time period.

12. A Signalling Connection and Control Part (SCCP) for use in a Signalling System no. 7 signalling network having at least one first time period and one second time period, the second time period defining at least one peak period during which heavy signalling traffic is expected, the SCCP comprising:

a Global Title Routing Case (GTRC) table mapping Global Titles to GTRCs;

a primary and a secondary destination signalling point allocated to each GTRC;

a changer that swaps said primary and secondary destination signalling points for a fraction of said GTRCs for the duration of said second period;

a mapper for mapping a Global Title, associated with a signalling transfer request received at the signalling transfer point, to a GTRC using the GTRC table;

means for determining the destination signalling point to be used for the request in dependence upon the primary and secondary destination signalling points allocated to the mapped GTRC and signalling point availability; and in case the primary destination signalling point is unable to handle signalling information, the secondary destination signalling point is used to handle the signalling information.

* * * * *